H. KORTEN.
PROCESS OF PURIFYING WATER.
APPLICATION FILED DEC. 9, 1907. RENEWED DEC. 24, 1908.

913,827.
Patented Mar. 2, 1909.
3 SHEETS—SHEET 1.

Witnesses:
N. S. Austin
F. E. Sheehy

Inventor:
Henry Korten
by
Joshua R. H. Potts
Atty.

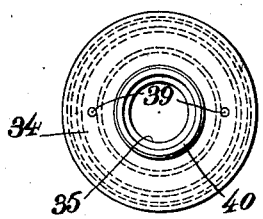
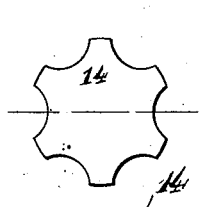
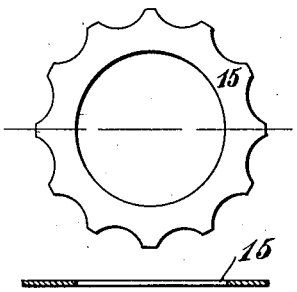
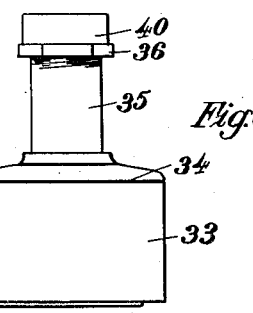
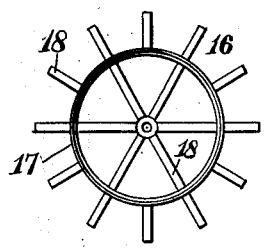
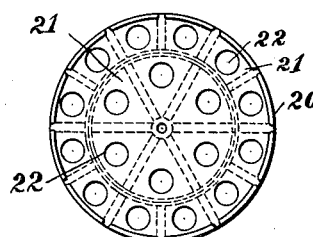
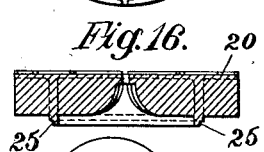
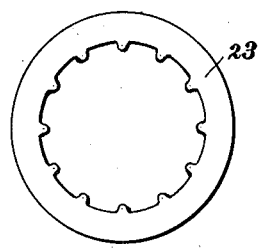

H. KORTEN.
PROCESS OF PURIFYING WATER.
APPLICATION FILED DEC. 9, 1907. RENEWED DEC. 24, 1908.
913,827.
Patented Mar. 2, 1909.
3 SHEETS—SHEET 3.
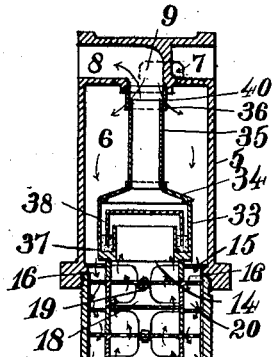
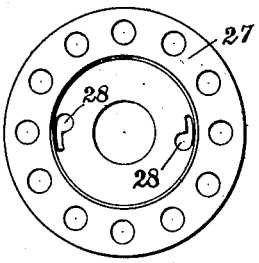
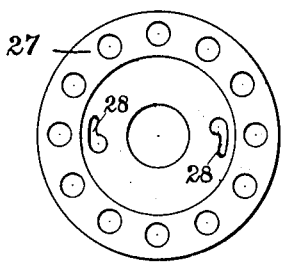
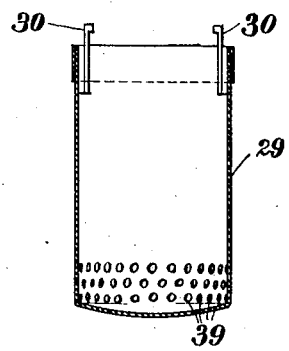
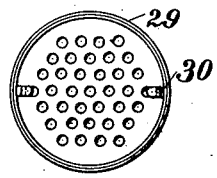
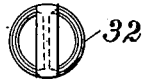
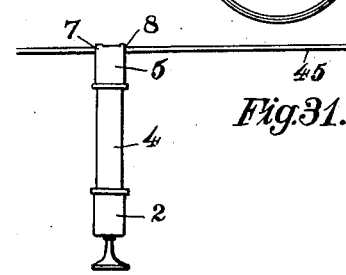
Witnesses:
H. J. Austin
F. C. Sheehy
Inventor
Henry Korten
by
Joshua R. H. Potts
Att'y.

UNITED STATES PATENT OFFICE.

HENRY KORTEN, OF CHICAGO, ILLINOIS, ASSIGNOR TO FREDERICK Y. NICHOLS, OF CHICAGO, ILLINOIS.

PROCESS OF PURIFYING WATER.

No. 913,827.      Specification of Letters Patent.      Patented March 2, 1909.

Application filed December 9, 1907, Serial No. 405,643. Renewed December 24, 1908. Serial No. 469,129.

*To all whom it may concern:*

Be it known that I, HENRY KORTEN, a citizen of the United States, residing at Chicago, county of Cook, and State of Illinois, have invented certain new and useful Improvements in Processes of Purifying Water, of which the following is a specification.

My invention relates to an improved process for purifying feed water for steam boilers. The object of my invention is to provide an improved process for purifying feed water for steam boilers whereby the scale forming substances shall be converted into non-scale forming substances and a large percentage thereof removed from the water before it passes into the boiler.

A further object of my invention is to provide a process of purifying feed water as mentioned, which shall be of low cost to maintain in operation, and which, when in operation, will cause any scale which has previously formed in the boiler to be detached from the surface of the boiler shell.

In carrying out my invention I employ a water purifier of peculiar construction and arrangement, and in the accompanying drawings illustrate the purifier in detail in order that the process may be more readily understood.

Figure 1:
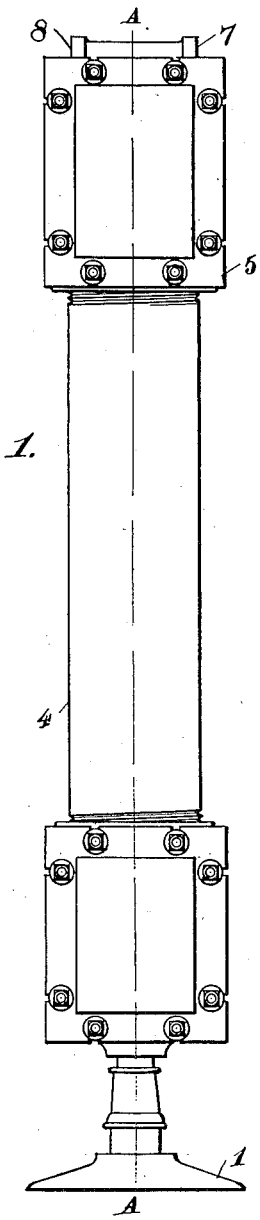
Figure 3:
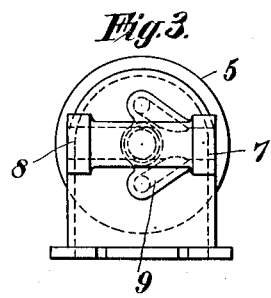
Figure 4:
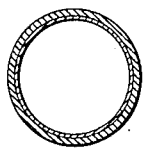
Figure 2:
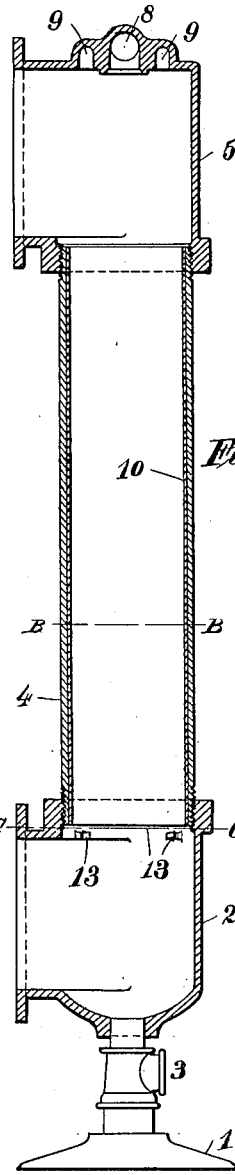
Figure 5:
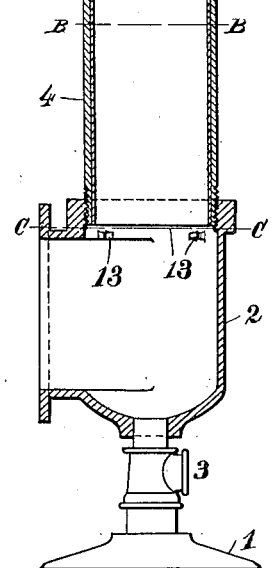

Figure 1 is a side view of the exterior portions of the purifier showing the cover plates that give access to its interior arrangements. Fig. 2 is a sectional view on the line A—A of Fig. 1 with the cover plates removed. Fig. 3 is a top plan view. Fig. 4 is a section on the line B—B of Fig. 2. Fig. 5 is a section on the line C—C of Fig. 2. Fig. 6 is an elevation of the mercury seal and filter forming a part of the purifier. Fig. 7 is a top plan view thereof. Fig. 8 is an axial section of the mercury seal and filter. Figs. 9 and 10 are plan and sectional views respectively of one of the elements of a repeating series of electro-positive plates which occupy the interior of the purifier. Figs. 11 to 20 are detail plan and sectional views of other positive elements making up the series of electro-plates which is repeated from top downward in the purifier. Figs. 21, 22 and 23 are top, side and bottom views respectively of the bottom electro-plate, the last of the positive series. Figs. 24 and 25 are top and sectional views respectively of a copper or other electro-negative perforated basket which is suspended from the bottom element of the series of electro-positive plates. Figs. 26 and 27 are plan and side views respectively of the electro-positive slotted disks which are placed in the basket illustrated in Fig. 25. Figs. 28 and 29 are plan and side view respectively of two of the disks illustrating them as meshed together when in the basket. Fig. 30 is a vertical sectional view of the assembled apparatus, and Fig. 31 is a diagram, illustrating the purifier as connected to a boiler.

In order that the process may be better understood the purifier will be first described in detail.

1 is the base of the purifier secured to the lower chamber, 2 and provided with the outlet, 3 through which the lower chamber may be "blown off" to remove sediment. The lower chamber, 2 is provided with a threaded opening in its upper side into which the cylinder, 4 forming the central portion of the purifier, is screwed. The opposite end of the cylinder 4 is screwed into an upper section, 5 having the chamber, 6, the inlet port, 7, and the outlet port, 8. The inlet, 7 has branched passages, 9 leading to the chamber, 6 on either side of the outlet passage, 8 which enter centrally at the top of the chamber. The cylindrical portion, 4 of the purifier is provided with a copper lining, 10, and contains throughout its length a series of zinc or zinc amalgam electro-plates resting at the bottom on the plate, 27 which in turn rests on the lugs, 13 in the lower chamber, 2. The electro-plates are so arranged that they form an inner cylindrical space 11, and outer annular space, 12, which spaces afford tortuous passages through and between the perforations and projections of the electro-plates.

The electro-plates are assembled in sets of six members shown in detail in Figs. 9 to 20, the number of sets used being governed by the length of the cylinder, 4. 14 and 15 are the first two plates at the top of a set. They rest upon the plate, 16 which is formed of a ring, 17 having radial arms or webs, 18, the plate 14 lying inside of the ring and the plate, 15 outside thereof. The plate, 16 is in turn supported on and bolted centrally to the plate, 20 by a bolt, 19 (see Fig. 30). This plate is similar to the plate, 16 inverted but in addition to the ring and arms it has on its upper side a horizontal web, 21 having the perforations, 22. Below the plate, 20 are the plates, 23 and 24 which are placed respectively around and within the projecting ring of plate, 20 thus completing the set. The ring of plate, 20 has a projecting edge, 25 which registers in a corresponding recess, 26 in the plate, 16 of the second set thus forming a continuous tight cylinder built up of the rings. The sets of plates are continued downwardly to the bottom of the cylinder, 4 where the bottom plate, 27 rests on the lugs, 13. The bottom plate, 27 is formed as clearly shown in Figs. 21 to 23, and has the slotted holes, 28 for supporting the metal basket, 29, by means of the hooks, 30. The basket is filled with disks, 31 placed together as shown at 32. (Figs. 28 and 29).

Arranged within the chamber, 6 is an annular cup, 33 which fits in the recess, 26 of the top plate, 16. The cup has a cover, 34 into which are fitted the pins, 39 from which is suspended an inverted cup, 38, the lower edge of which is immersed in mercury filling the bottom of the cup 33. The cover, 34 is provided with a central aperture having a web, 41 on which rests the lower end of a conduit, 35 and lugs or ears, 42 which fit into suitable slots in said conduit. The conduit communicates with the outlet passage 8 by means of a threaded ring, 36 on its upper end, which is screwed up against the lower side of ring, 40, the ring, 40 fitting into the outlet, 8 forming a tight joint. The annular cup, 33 contains mercury in the annular space, into which the rim of the cup, 38 is immersed forming a mercury seal between the center of the annular cup, 33 and the conduit 35.

The water enters the port, 7 and passes to the chamber, 6 through the branch passages, 9. It then flows downwardly with a zig-zag movement created by the position of the apertures and ribs of the plates, 15, 16, 20 and 23, as shown by the arrows in Fig. 30, through the annular space, 12 to the lower chamber, 2, here it enters the basket, 29 through the apertures, 39 where it comes in contact with the disks, 32, and then ascends in the central cylindrical spaces, 11 with a zig-zag movement created by the position of the apertures and ribs of the plates, 24, 20, 16, and 14, as shown by the arrows in Fig. 30. It thence passes through the mercury seal in the cup 33 and the conduit, 35 to the outlet, 8. From the outlet 8 the water passes by a pipe, 45 to the boiler, 46.

My invention consists generally in submitting the feed water to electrical action as it passes from the source of supply to the boiler, which reduces the sulfates, carbonates, and other soluble scale forming substances into insoluble oxids and other non-scale forming substances.

My invention further consists in agitating the water which has been electrically acted upon as mentioned to collect the small particles of insoluble substances which are held in suspension into cohering masses which will settle in places where they can be drawn off or readily filtered from the water.

It is obvious that various arrangements may be devised for electrically acting upon the water to chemically change its impurities and to agitate, collect and separate the impurities both by precipitation and filtration. However, I find the apparatus hereinbefore described simple and efficient for performing all of the above steps in the process.

Further, and more particularly my invention consists in passing the water over electro-positive and electro-negative elements, forming a voltaic pile and from thence to the boiler in an unbroken stream, one of the elements of said voltaic pile being positive with relation to the iron of the boiler shell and the other negative. For this purpose zinc and copper are preferably used.

To illustrate my improved process of purifying feed water I shall describe the operation of the purifier illustrated in the drawings. The water enters through the inlet port, 7 and passes into the chamber, 6, passing downwardly through the intricate passage, 12 bringing the water into intimate contact with the electro-positive or zinc elements filling the cylinder, 4. It thence passes into the chamber 2, through the basket, 29 and disks, 32 and upwardly through a tortuous passage, 11. When the device is supplied with water, electrical action is set up between the zinc, or electro-positive elements and the copper, or electro-negative elements. The electrical action thus set up rapidly changes the sulfates, carbonates and other soluble scale forming substances into the oxids most of which are insoluble and the remainder harmless. The rapidity with which this chemical action takes place is substantially proportional to the intimacy of the contact between the water and the electroplates and the degree of proximity of the positive and negative electro-plates. In the device described all portions of the water are brought into intimate contact with the plates during its passage through the tortuous passages, 12 and 11. The intricacy of the passage also serves another purpose, namely, to agitate the water to such an extent as to cause the fine particles of insoluble matter held in suspension to cohere in masses of sufficient magnitude to settle to the bottom of the device where they may be readily drawn off or to be readily filtered therefrom. The portions which settle, collect in the chamber, 2, and are readily drawn off through the outlet, 3. From the passage, 11, the water is passed through the mercury filter arranged at the top of the device. This collects substantially all of the insoluble matter which is too minutely divided to settle into the chamber, 2, as well as all of the grease and oils contained in the water, the latter collecting in the top of the inverted cup, 38. The water passes from the filter to the boiler in an unbroken column through the pipe, 45. The iron of the boiler is electro-negative with relation to the zinc in the purifier hence, so long as the column of water is uninterrupted, electrical action is set up between the zinc and iron. This causes a quantity of hydrogen to be released and collect upon the surface of the iron. The mechanical action of the hydrogen causes the scale, if any has been formed from the boiler to disintegrate or become detached from the boiler shell and settle as mud in the bottom of the boiler whence it can be readily drawn off. According to the composition of the scale nascent hydrogen and the small quantity of acid which is formed by the decomposition of the substances, particularly the sulfates may or may not cause a further reduction of the scale.

In practice the zinc within the purifier has sufficient surface exposed to maintain an adequate local electrical action and to maintain electrical action with the boiler. For obvious reasons the zinc plates are formed of an amalgam. I find an amalgam of zinc and mercury containing about 30 per cent. of the latter to be efficient. This I have found to remain unchanged at a temperature of 212° Fahrenheit, a temperature beyond which the device is used in pactice. I prefer to heat the water to about 160° Fahrenheit before passing it through the purifier as I find that the electrical action is greatly increased, with a more rapid purification of the water.

Having described my invention what I claim as new and desire to secure by Letters Patent is:

1. The process of purifying feed water consisting in subjecting the water to electrical action to change the soluble impurities to insoluble substances and then filtering through mercury.

2. The process of purifying feed water consisting in passing the water through a tortuous passage between electro-plates forming a voltaic pile to change the soluble impurities into insoluble impurities and to collect them in mass some of which is precipitated and the rest held in suspension, drawing off the precipitate and filtering out the remaining impurities by passing the water through mercury.

In testimony whereof I have signed my name to this specification in the presence of two subscribing witnesses.

HENRY KORTEN

Witnesses:
 PRESTON W. BARCLAY,
 FRANCES E. SHEEHY.